United States Patent
Zhi et al.

(10) Patent No.: US 10,959,122 B2
(45) Date of Patent: Mar. 23, 2021

(54) METHOD AND DEVICE FOR TRANSMITTING DATA

(71) Applicant: SAMSUNG ELECTRONICS CO., LTD., Suwon-si (KR)

(72) Inventors: Yajun Zhi, Xi'an (CN); Jin Zhang, Xi'an (CN); Lifeng Zhao, Xi'an (CN); Fei Wang, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/169,534

(22) Filed: Oct. 24, 2018

(65) Prior Publication Data

US 2019/0132763 A1 May 2, 2019

(30) Foreign Application Priority Data

Oct. 27, 2017 (CN) .......................... 201711023274.2

(51) Int. Cl.
*H04W 28/02* (2009.01)
*H04W 4/80* (2018.01)
(Continued)

(52) U.S. Cl.
CPC ......... *H04W 28/0221* (2013.01); *H04W 4/80* (2018.02); *H04W 52/0219* (2013.01); *H04W 88/06* (2013.01); *H04W 84/18* (2013.01)

(58) Field of Classification Search
CPC ............... H04W 28/0221; H04W 4/80; H04W 52/0219; H04W 88/06; H04W 84/18
See application file for complete search history.

(56) References Cited

U.S. PATENT DOCUMENTS

| 8,111,156 B2 | 2/2012 | Song et al. |
| 9,596,708 B2 | 3/2017 | Logue et al. |

(Continued)

FOREIGN PATENT DOCUMENTS

| CN | 106658372 | 5/2017 |
| CN | 107135472 | 9/2017 |

(Continued)

*Primary Examiner* — Fahmida S Chowdhury
(74) *Attorney, Agent, or Firm* — F. Chau & Associates, LLC (57) ABSTRACT

A method of wirelessly transmitting data by a first electronic apparatus configured to initially perform communication using a first wireless communication manner, includes: the first electronic apparatus determining whether performing data transmission through a second wireless communication manner is required; the first electronic apparatus sending a data transmission request message through the first wireless communication manner when it is determined that performing data transmission through the second wireless communication manner is required; and the first electronic apparatus performing data transmission with a second electronic apparatus through the second wireless communication manner after a data transmission acknowledgement message is received from the second electronic apparatus through the first wireless communication manner. The data transmission request message includes indicating information indicating the first electronic apparatus desires to perform the data transmission using the second wireless communication manner.

17 Claims, 3 Drawing Sheets

(51) Int. Cl.
*H04W 52/02* (2009.01)
*H04W 88/06* (2009.01)
*H04W 84/18* (2009.01)

(56) References Cited

U.S. PATENT DOCUMENTS

| | | |
|---|---|---|
| 2012/0057587 A1 | 3/2012 | Yang et al. |
| 2014/0064199 A1* | 3/2014 | Pan .................. H04L 1/1867 |
| | | 370/329 |
| 2014/0233536 A1* | 8/2014 | Kang .................. H04L 5/1438 |
| | | 370/336 |
| 2014/0287690 A1 | 9/2014 | Kim |
| 2015/0004937 A1* | 1/2015 | Kremen .............. H04B 5/0031 |
| | | 455/411 |
| 2016/0295355 A1 | 10/2016 | Yuan et al. |
| 2016/0363944 A1 | 12/2016 | Kim et al. |
| 2017/0201936 A1* | 7/2017 | Fu .......................... H04L 43/16 |

FOREIGN PATENT DOCUMENTS

| | | |
|---|---|---|
| GB | 2512393 | 10/2014 |
| KR | 1020160146389 | 12/2016 |
| KR | 1020170000678 | 1/2017 |
| WO | 2016058367 | 4/2016 |

\* cited by examiner

METHOD AND DEVICE FOR TRANSMITTING DATA

CROSS-REFERENCE TO RELATED APPLICATION

This U.S. non-provisional patent application claims priority under 35 U.S.C. § 119 to Chinese Patent Application No. 201711023274.2, filed on Oct. 27, 2017, in the Chinese Patent Office, the disclosure of which is incorporated by reference in its entirety herein.

BACKGROUND

1. Technical Field

Embodiments of the present inventive concept relate to the technical field of data transmission, and more particularly, relate to a method and device for transmitting data.

2. Discussion of Related Art

Data often needs to be transmitted between different electronic devices to meet various user requirements. Data can be exchanged wirelessly between electronic devices through various wireless communication protocols. For example, smart home devices in a smart home system can wirelessly exchange data with each other to realize functions such as control of household electrical appliances and outdoor monitoring. Current wireless communication protocols used to exchange data between electronic devices cannot meet both the requirement of low power consumption and the requirement of ensuring a transmission rate for specific data.

SUMMARY

An exemplary embodiment of the present inventive concept provides a method and device for wirelessly transmitting data.

According to an exemplary embodiment of the present inventive concept, there is provided a method of wirelessly transmitting data by a first electronic apparatus configured to initially perform communication using a first wireless communication manner. The method includes: the first electronic apparatus determining whether performing data transmission through a second wireless communication manner is required; the first electronic apparatus sending a data transmission request message through the first wireless communication manner when it is determined that performing data transmission through the second wireless communication manner is required; and the first electronic apparatus performing data transmission with a second electronic apparatus through the second wireless communication manner after a data transmission acknowledgement message is received from corresponding the second electronic apparatus. The data transmission request message includes indicating information indicating the first electronic apparatus desires to perform data transmission using the second wireless communication manner. According to the method, it is possible to perform communication by selecting a proper communication manner much more flexibly according to needs.

In an exemplary embodiment, a data transmission rate of the first wireless communication manner is lower than that of the second wireless communication manner. In another embodiment, data transmission rate and power consumption of the first wireless communication manner are all lower than those of the second wireless communication manner. According to the method, it is possible to perform data transmission using the second wireless communication manner when the second wireless communication manner with a higher transmission rate is needed to transmit data rapidly. While in other circumstances, the first wireless communication with lower power consumption is used for communication, and thus the power consumption of the first electronic apparatus can be reduced, and it can also ensure that the data is transmitted rapidly and in real-time, as needed.

In an embodiment, the first electronic apparatus determines whether it is required to perform data transmission through the second wireless communication manner according to at least one of a data type of data to be transmitted, a data amount of data to be transmitted, and whether a preset event occurs.

In an exemplary embodiment, the indicating information includes at least one of information for indicating the data amount of data to be transmitted, information for indicating the data type of data to be transmitted, information for indicating the preset event occurring currently, information for indicating a type of the second wireless communication manner, and preset byte information.

In exemplary embodiment, the method further includes: the first electronic apparatus determining whether to stop performing data transmission with the second electronic apparatus through the second wireless communication manner when at least one of the following conditions is satisfied: receiving a user instruction for stopping performing data transmission with the second electronic apparatus through the second wireless communication manner; determining that a priority of performing data transmission with the second electronic apparatus is lower than that of performing data transmission with a third electronic apparatus; and receiving a message, sent by the second electronic apparatus, for notifying to stop performing data transmission through the second wireless communication manner.

In an exemplary embodiment, the first wireless communication manner is a manner to perform communication via a ZigBee network, and the second wireless communication manner is a manner to perform communication via one of a Wi-Fi Direct network, a Wi-Fi network, and a Bluetooth network.

According to an exemplary embodiment of the present inventive concept, there is provided a method of wirelessly transmitting data by a second electronic apparatus configured to initially perform communication using a first wireless communication manner. The method includes: the second electronic apparatus receiving a data transmission request message from a first electronic apparatus through the first wireless communication manner; the second electronic apparatus sending a data transmission acknowledgement message to the first electronic apparatus through the first wireless communication manner after is the second electronic apparatus determines it is to perform data transmission with the first electronic apparatus through the second wireless communication manner according to the indicating information; and the second electronic apparatus performing data transmission with the first electronic apparatus through the second wireless communication manner. The data transmission request message includes indicating information indicating the first electronic apparatus desires to perform data transmission using a second wireless communication manner. According to the method, it is possible to perform communication by selecting a proper communication manner much more flexibly according to needs.

In an exemplary embodiment, a data transmission rate of the first wireless communication manner is lower than that of the second wireless communication manner. In another exemplary embodiment, a data transmission rate and power consumption of the first wireless communication manner are all lower than those of the second wireless communication manner. According to the method, it is possible to perform data transmission using the second wireless communication manner when the second wireless communication manner with a higher transmission rate is needed to transmit data rapidly, while in other circumstances, the first wireless communication with lower consumption is used for communication. Thus the power consumption of the first electronic apparatus can be reduced, and it can also ensure that the data is transmitted rapidly and in real-time, as needed.

In an exemplary embodiment, the indicating information includes at least one of information for indicating a data amount of data to be transmitted, information for indicating a data type of data to be transmitted, information for indicating a preset event occurring currently, information for indicating a type of the second wireless communication manner, and preset byte information.

In an exemplary embodiment, the method further includes: the second electronic apparatus determining whether to stop performing data transmission with the first electronic apparatus through the second wireless communication manner when at least one of the following conditions is satisfied: receiving a user instruction of stopping performing data transmission with the first electronic apparatus through the second wireless communication manner; and receiving a message, sent by the first electronic apparatus, for notifying to stop performing data transmission through the second wireless communication manner.

According to an exemplary embodiment of the present inventive concept, there is provided a computer readable storage medium, having a computer program stored thereon, wherein the computer program is configured to enable a processor of a computer to: perform, by a first electronic apparatus, communication using a first wireless communication manner; determine, by the first electronic apparatus, whether data transmission through a second wireless communication manner is required; send, by the first electronic apparatus, a data transmission request message through the first wireless communication manner when it is determined that data transmission through the second wireless communication manner is required; and perform, by the first electronic apparatus, data transmission with a second electronic apparatus through the second wireless communication manner after a data transmission acknowledgement message is received from the second electronic apparatus through the first wireless communication manner. The data transmission request message includes indicating information indicating the first electronic apparatus desires to perform data transmission using the second wireless communication manner.

According to an exemplary embodiment of the present inventive concept, there is provided a computer readable storage medium, having a computer program stored thereon, wherein the computer program is configured to enable a processor of a computer to: perform, by a second electronic apparatus, communication using a first wireless communication manner; receive, by the second electronic apparatus, a data transmission request message sent by a first electronic apparatus through the first wireless communication manner; send, by the second electronic apparatus, a data transmission acknowledgement message to the first electronic apparatus through the first wireless communication manner after is the second electronic apparatus determines it is to perform data transmission with the first electronic apparatus through the second wireless communication manner according to the indicating information; and perform, by the second electronic apparatus, data transmission with the first electronic apparatus through the second wireless communication manner. The data transmission request message includes indicating information indicating the first electronic apparatus desires to perform data transmission using a second wireless communication manner.

According to an exemplary embodiment of the present inventive concept, there is provided a device including a first electronic apparatus for wirelessly transmitting data. The device initially performs communication using a first wireless communication manner. The device includes: a circuit configured to determine whether to perform data transmission through a second wireless communication manner; a first wireless transceiver configured to send a data transmission request message through the first wireless communication manner when the circuit determines that performing data transmission through the second wireless communication manner is required; and a second wireless transceiver configured to perform data transmission with a second electronic apparatus through the second wireless communication manner after the first wireless transceiver receives, through the first wireless communication manner, a data transmission acknowledgement message from the second electronic apparatus. The data transmission request message includes indicating information indicating the first electronic device desire to perform data transmission using the second wireless communication manner.

In an embodiment, a data transmission rate of the first wireless communication manner is lower than that of the second wireless communication manner. In another embodiment, a data transmission rate and power consumption of the first wireless communication manner are all lower than those of the second wireless communication manner.

In an embodiment, the circuit determines whether it is required to perform data transmission through the second wireless communication manner according to at least one of a data type of data to be transmitted, a data amount of data to be transmitted, and whether a preset event occurs.

In an embodiment, the indicating information includes at least one of information for indicating the data amount of data to be transmitted, information for indicating the data type of data to be transmitted, information for indicating the preset event occurring currently, information for indicating a type of the second wireless communication manner, and preset byte information.

In an embodiment, the circuit determines it is to stop performing data transmission with the second electronic apparatus through the second wireless communication manner when at least one of the following conditions is satisfied: receiving a user instruction of stopping performing data transmission with the second electronic apparatus through the second wireless communication manner; determining that a priority of performing data transmission with the second electronic apparatus is lower than that of performing data transmission with a third electronic apparatus; and receiving a message, sent by the second electronic apparatus, for notifying to stop performing data transmission through the second wireless communication manner.

In an embodiment, the first wireless communication manner is a manner to perform communication via a ZigBee network, and the second wireless communication manner is a manner to perform communication via one of a Wi-Fi Direct network, a Wi-Fi network, and a Bluetooth network.

According to an exemplary embodiment of the present inventive concept, there is provided a device including a second electronic apparatus for wirelessly transmitting data to a first electronic apparatus. The second electronic apparatus is initially configured to perform communication using a first wireless communication manner. The device includes: a first wireless transceiver configured to receive a data transmission request message from the first electronic apparatus through the first wireless communication manner; a circuit configured to determine whether to perform data transmission with the first electronic apparatus through the second wireless communication manner according to the indicating information; and a second wireless transceiver configured to perform data transmission with the first electronic apparatus through the second wireless communication manner after the first wireless transceiver sends the data transmission acknowledgement message to the first electronic apparatus through the first wireless communication manner. The data transmission request message includes indicating information indicating the first electronic apparatus desires to perform data transmission using the second wireless communication manner. The first wireless transceiver sends a data transmission acknowledgement message to the first electronic apparatus through the first wireless communication manner after the circuit determines it is to perform data transmission with the first electronic apparatus through the second wireless communication manner.

In an embodiment, a data transmission rate of the first wireless communication manner is lower than that of the second wireless communication manner. In another embodiment, a data transmission rate and power consumption of the first wireless communication manner are all lower than those of the second wireless communication manner.

In an embodiment, the indicating information includes at least one of information for indicating data amount of data to be transmitted, information for indicating a data type of data to be transmitted, information for indicating a preset event occurring currently, information for indicating a type of the second wireless communication manner, and preset byte information.

In an embodiment, the circuit determines it is to stop performing data transmission with the first electronic apparatus through the second wireless communication manner when at least one of the following conditions is satisfied: receiving a user instruction of stopping performing data transmission with the first electronic apparatus through the second wireless communication manner; and receiving a message, sent by the first electronic apparatus, for notifying to stop performing data transmission through the second wireless communication manner.

The method and device of transmitting data according to the exemplary embodiments of the present inventive concept can make an electronic apparatus perform data transmission with another electronic apparatus through a proper wireless communication manner according to circumstances, thereby meeting multiple requirements as is reducing power consumption and ensuring a transmission rate for specific data.

BRIEF DESCRIPTION OF THE DRAWINGS

Exemplary embodiments of the present inventive concept will become more apparent, from the following descriptions in combination with the accompanying drawings below, which illustrate the embodiments in which.

DETAILED DESCRIPTION OF EXEMPLARY EMBODIMENTS

Hereinafter, exemplary embodiments of the present inventive concept in conjunction with accompany drawings will be described. Below, details, such as detailed configurations and structures, are provided to aid a reader in understanding embodiments of the inventive concept. Therefore, embodiments described herein may be variously changed or modified without departing from embodiments of the inventive concept. The same reference numeral indicates the same part throughout the accompany drawings.

Figure 1:
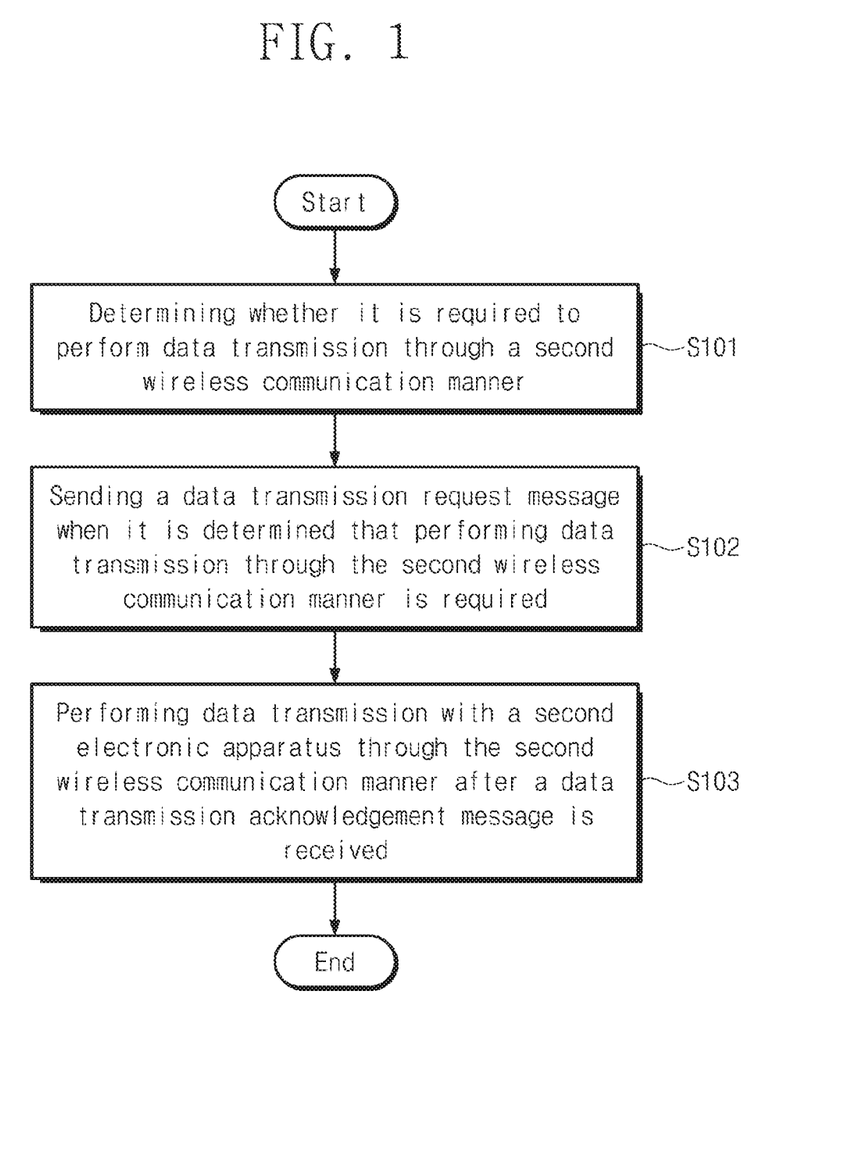
FIG. 1 illustrates a flowchart of a method of transmitting data for a first electronic apparatus according to an exemplary embodiment of the present inventive concept.

FIG. 1 illustrates a flowchart of a method of transmitting data for a first electronic apparatus (e.g., a mobile device) according to an exemplary embodiment of the present inventive concept. Here, the first electronic apparatus performs a communication using a first wireless communication manner.

The first electronic apparatus may be a mobile communication terminal (e.g., a smart mobile phone, a smart wearable device (e.g., a smart watch), a personal computer, a tablet computer, or a smart home device.

Referring to FIG. 1, in step S101, the first electronic apparatus determines whether data transmission through a second wireless communication manner is required. For example, if the first electronic apparatus is currently configured to communicate using the first wireless communication manner, but the first electronic apparatus is scheduled to communicate with a second electronic apparatus that is configured to communicate using the second wireless communication manner, the first electronic apparatus could conclude that data transmission through the second wireless communication manner is required.

In an exemplary embodiment, the first wireless communication manner is a first wireless communication protocol, and the second wireless communication manner is a second wireless communication protocol that differs from the first wireless communication protocol.

In an exemplary embodiment, the first wireless communication manner and the second wireless communication manner use the same wireless communication protocol, but transmit data at different rates. In an exemplary embodiment, the data transmission rate of the first wireless communication manner is lower than that of the second wireless communication manner.

In an exemplary embodiment, the data transmission rate of the first wireless communication manner is lower than that of the second wireless communication manner, and power consumption of the first wireless communication manner is lower than that of the second wireless communication manner.

As an example, the first wireless communication manner may be a manner to perform communication via a ZigBee network or a Z-wave network; and the second wireless communication manner may be a manner to perform communication via one of a Wi-Fi Direct network, a Wi-Fi network, and a Bluetooth network.

Compared with other wireless communication technologies, ZigBee wireless communication technology and Z-wave wireless communication technology typically use less power and can support a Mesh topology function. However, the data transmission rate of ZigBee wireless communication technology and Z-wave wireless communication technology is too low to meet rapid transmission of mass data (e.g., multimedia data).

Although a Wi-Fi Direct network, a Wi-Fi network, and Bluetooth network has a higher data transmission rate, the Wi-Fi Direct network and the Wi-Fi network only support a peer-to-peer (P2P) connection or a Group connection and cannot implement a Mesh connection. Further, power consumption of an electronic apparatus is comparatively large when running a Wi-Fi Direct communication protocol, a Wi-Fi communication protocol, or a Bluetooth communication protocol.

As another example, the first wireless communication manner may be a manner to perform communication via a Bluetooth Mesh network, and the second wireless communication manner may be a manner to perform communication via a Wi-Fi Direct network or a Wi-Fi network.

As an example, the first electronic apparatus could determine that data transmission through the second wireless communication manner is required according to a data type of data to be transmitted. For example, if the first electronic apparatus is scheduled to transmit data of a data types such as a multimedia data type, the first electronic apparatus can conclude that data transmission through the second wireless communication manner is required. For example, the multimedia data type may include audio data, video data, and image data.

As another example, the first electronic apparatus could determine that data transmission through the second wireless communication manner is required according to an amount of data to be transmitted. For example, the first electronic apparatus could conclude that data transmission through the second wireless communication manner is required when it is detected that the amount of data to be transmitted is larger than a predetermined threshold value.

As another example, the first electronic apparatus determines data transmission through the second wireless communication manner is required according to whether a preset event occurs. For example, the first electronic apparatus could conclude that transmission through the second wireless communication manner is required when it has detected the occurrence of the preset event. For example, the present event could indicate that data related to the preset event needs to be transmitted through the second wireless communication manner.

Preset events may be various types of events set in advance. As an example, the first electronic apparatus may be a door guard. When the first electronic apparatus detects an occurrence of a preset event (e.g., someone appears at the door, someone makes a call through the door guard, a preset time point is reached), the first electronic apparatus can conclude that data transmission through the second wireless communication manner is required. As another example, the first electronic apparatus may be an apparatus for video monitoring. When the first electronic apparatus detects an occurrence of a preset event (for example, a user requests to watch a monitor video controller by another electronic apparatus to capture video or images), the first electronic device can conclude that data transmission through the second wireless communication manner is required.

In step S102, the first electronic apparatus sends a data transmission request message through the first wireless communication manner when it determines data transmission through the second wireless communication manner is required. In an embodiment, the data transmission request message includes indicating information which is used to indicate that performing data transmission using the second wireless communication manner is desired.

That is, the data transmission request message is used by the first electronic apparatus to request performing data transmission with the second electronic apparatus through the second wireless communication manner.

As an example, the indicating information may include at least one of information for indicating a data amount of data to be transmitted, information for indicating a data type of data to be transmitted, information for indicating a preset event currently occurring, information for indicating a type of the second wireless communication manner, and preset byte information.

As an example, the first electronic apparatus may send the data transmission request message (that is, a unicast message) to the second electronic apparatus. As another example, the first electronic apparatus may send the data transmission request message (that is, a broadcast message) to a plurality of electronic apparatuses including the second electronic apparatus. For example, the first electronic apparatus may send the data transmission request message to another electronic apparatus in a same first wireless network as the first electronic apparatus, wherein the first wireless network is a wireless network used by the first wireless communication manner.

In step S103, the first electronic apparatus transmits data to the second electronic apparatus through the second wireless communication manner after receiving a data transmission acknowledgement message from the second electronic apparatus. The second electronic apparatus sends the data transmission acknowledgement message in response to receiving the data transmission request message through the first wireless communication manner. In an embodiment, the second electronic apparatus sends the data transmission acknowledgement message to the first electronic apparatus using the first communication manner.

In an embodiment, the data transmission acknowledgement message is used to indicate that the second electronic apparatus is ready to perform data transmission with the first electronic apparatus through the second wireless communication manner.

As an example, after the data transmission acknowledgement message corresponding to the data transmission request message sent by the second electronic apparatus is received through the first wireless communication manner, the first electronic apparatus establishes a connection with the second electronic apparatus using the second wireless communication manner. The first electronic apparatus then performs one or more data transmissions with the second electronic apparatus through the second wireless communication manner.

The first electronic apparatus may continue transmitting data to the second electronic apparatus through the second wireless communication manner until a certain condition has been satisfied. For example, when the certain condition is satisfied, the first electronic apparatus stops performing data transmission with the second electronic apparatus through the second wireless communication manner.

In an exemplary embodiment, the first electronic apparatus is configured to stop performing data transmission with the second electronic apparatus through the second wireless communication manner upon receiving a certain user instruction from a user.

In an exemplary embodiment, the first electronic apparatus is configured to stop performing data transmission with the second electronic apparatus through the second wireless communication manner when it is determined that a priority of performing data transmission with the second electronic apparatus is lower than that of performing data transmission with a third electronic apparatus.

As an example, the priority of performing data transmission with the second electronic apparatus being lower than that of performing data transmission with the third electronic apparatus may be: a priority of data transmitted by the second electronic apparatus is lower than that of data transmitted by the third electronic apparatus; and/or, a priority of the second electronic apparatus is lower than that of the third electronic apparatus.

For example, the first electronic apparatus may include a memory storing a table that provides the priority of various electronic apparatuses or the priority of various types of data.

In an exemplary embodiment, the first electronic apparatus it configured to stop performing data transmission with the second electronic apparatus through the second wireless communication manner upon receiving a message from the second electronic apparatus through the second wireless communication. For example, the message could notify the first electronic apparatus that it no longer has permission to communicate with the second electronic apparatus or no longer has permission to communicate using the second wireless communication manner.

The second electronic apparatus can transmit the message notifying to stop performing data transmission through the second wireless communication manner through the first wireless communication manner and/or the second wireless communication manner. However, the inventive concept is not limited thereto.

In an embodiment, the first electronic apparatus includes a first communication module (e.g., a first wireless transceiver) for communicating through the first wireless communication manner and a second communication module (e.g., a second wireless transceiver) for communicating through the second wireless communication manner. In an embodiment, the first electronic apparatus keeps the second communication module in a sleep state when the second wireless communication manner is not used, so as to reduce power consumption of the first electronic apparatus.

Figure 2:
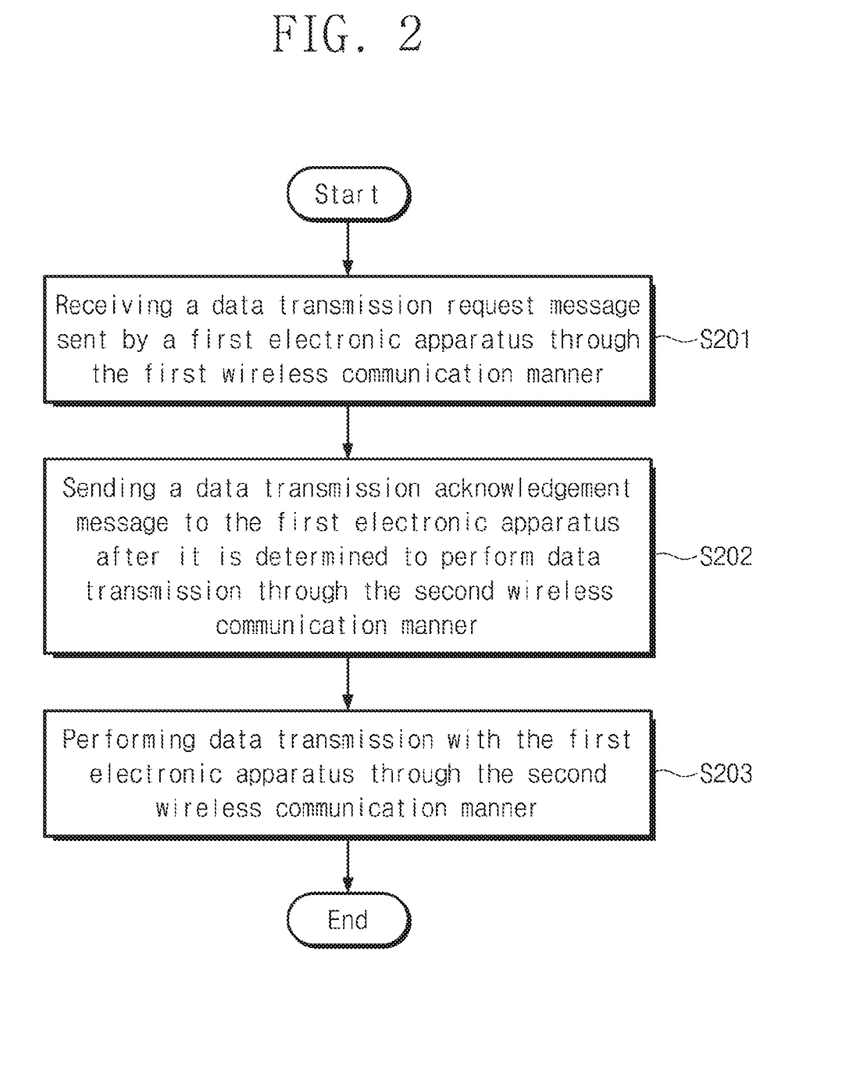
FIG. 2 illustrates a flowchart of a method of transmitting data for a second electronic apparatus according to an exemplary embodiment of the present inventive concept.

FIG. 2 illustrates a flowchart of a method of transmitting data for the second electronic apparatus according to an exemplary embodiment of the present inventive concept. Here, the second electronic apparatus performs communication initially using the first wireless communication manner.

The second electronic apparatus may be a mobile communication terminal (e.g., a smart mobile phone), a smart wearable device (e.g., a smart watch), a personal computer, a tablet computer, a smart home equipment.

Referring to FIG. 2, in step S201, the data transmission request message sent by the first electronic apparatus is received through the first wireless communication manner. In an embodiment, the data transmission request message includes indicating information indicating that the first electronic apparatus desires to perform data transmission using the second wireless communication manner.

In an exemplary embodiment, data transmission rate of the first wireless communication manner is lower than that of the second wireless communication manner.

In another exemplary embodiment, a data transmission rate of the first wireless communication manner is lower than that of the second wireless communication manner, and power consumption of the first wireless communication manner is lower than that of the second wireless communication manner.

As an example, the indicating information may include at least one of information for indicating a data amount of data to be transmitted, information for indicating a data type of data to be transmitted, information for indicating a preset event currently occurring, information for indicating a type of the second wireless communication manner, and preset byte information.

In step S202, the data transmission acknowledgement message is sent to the first electronic apparatus through the first wireless communication manner after it is determined to perform data transmission with the first electronic apparatus through the second wireless communication manner according to the indicating information. For example, the second electronic apparatus may send the data transmission acknowledgement message after it is ready to communicate with the first electronic apparatus using the second wireless communication manner.

In step S203, second electronic apparatus begins performing data transmission with the first electronic apparatus through the second wireless communication manner.

In an embodiment, the second electronic apparatus continues performing data transmission with the first electronic apparatus through the second wireless communication manner until a certain condition is satisfied. As an example, the second electronic apparatus stops performing data transmission with the first electronic apparatus through the second wireless communication manner when the certain condition is satisfied.

As an example, the second electronic apparatus stops performing data transmission with the first electronic apparatus through the second wireless communication manner upon receiving a user instruction from a user. For example, the user instruction is for stopping the performing of data transmission with the first electronic apparatus through the second wireless communication manner.

As another example, the second electronic apparatus stops performing data transmission with the first electronic apparatus through the second wireless communication manner upon receiving a message from the first electronic apparatus. For example, the message is for notifying to stop the performing of data transmission through the second wireless communication.

In an embodiment, the second electronic apparatus includes a first communication module (e.g., a first wireless transceiver) for communicating through the first wireless communication manner and a second communication module (e.g., a second wireless transceiver) for communicating through the second wireless communication manner. In an embodiment, the second electronic apparatus keeps the second communication module in a sleep state when the second wireless communication manner is not used, so as to reduce power consumption of the second electronic apparatus.

Figure 3:
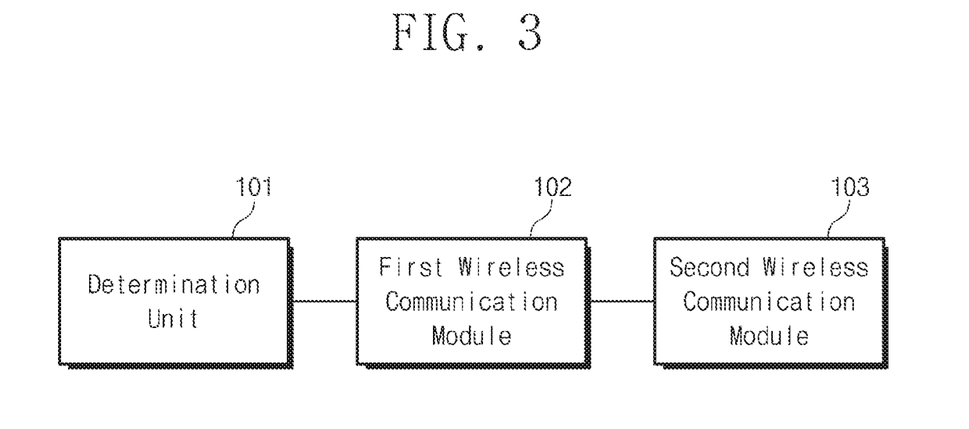
FIG. 3 illustrates a block diagram of a device for transmitting data according to an exemplary embodiment of the present inventive concept.

FIG. 3 illustrates a block diagram of a device (e.g., a first electronic apparatus) for transmitting data according to an exemplary embodiment of the present inventive concept. Here, the device initially performs communication using a first wireless communication manner.

As shown in FIG. 3, the device for transmitting data according to an exemplary embodiment of the present invention includes: a determination unit 101, a first wireless communication module 102 and a second wireless communication module 103.

The determination unit 101 is configured to determine whether the device is required to perform data transmission through a second wireless communication manner. In an embodiment, the determination unit 101 is implemented using a circuit such as central processing unit (CPU) or a microprocessor.

In an embodiment, a data transmission rate of the first wireless communication manner is lower than that of the second wireless communication manner.

In another embodiment, a data transmission rate and power consumption of the first wireless communication manner are each lower than those of the second wireless communication manner.

As an example, the first wireless communication manner may be a manner to perform communication via a ZigBee network, and the second wireless communication manner may be a manner to perform communication via one of a Wi-Fi Direct network, a Wi-Fi network, and a Bluetooth network.

As an example, the determination unit 101 determines whether the device is required to perform data transmission through the second wireless communication manner according to at least one of a data type of data to be transmitted, a data amount of data to be transmitted, and whether a preset event occurs.

The first wireless communication module 102 (e.g., a first wireless transceiver) is configured to send a data transmission request message through the first wireless communication manner when the determination unit 101 determines that performing data transmission through the second wireless communication manner is required. The data transmission request message includes indicating information which is used to indicate that the device desires to perform data transmission using the second wireless communication manner.

As an example, the indicating information may include at least one of information for indicating the data amount of data to be transmitted, information for indicating the data type of data to be transmitted, information for indicating the preset event occurring currently, information for indicating a type of the second wireless communication manner, and preset byte information.

The second wireless communication module 103 is configured to perform data transmission with a second electronic apparatus through the second wireless communication manner after the first wireless communication module 102 receives, through the first wireless communication manner, a data transmission acknowledgement message corresponding to the data transmission request message sent by the second electronic apparatus.

The device (e.g., the first electronic apparatus) may continue to transmit data to the second electronic apparatus through the second wireless communication manner until a certain condition is satisfied. As an example, the determination unit 101 may determine that the device is to stop performing data transmission with the second electronic apparatus through the second wireless communication manner when at least one of the following conditions is satisfied: receiving a user instruction for stopping performing data transmission with the second electronic apparatus through the second wireless communication manner; determining that a priority of performing data transmission with the second electronic apparatus is lower than that of performing data transmission with a third electronic apparatus; and receiving a message, sent by the second electronic apparatus, for notifying to stop performing data transmission through the second wireless communication manner.

Figure 4:
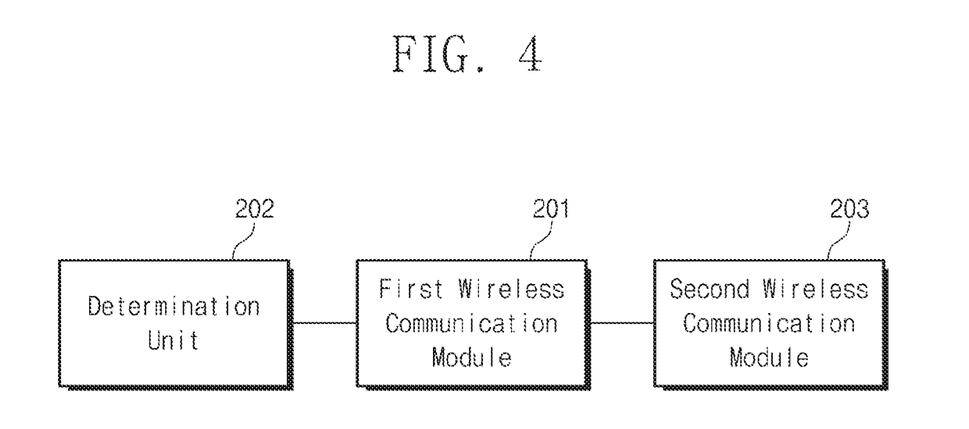
FIG. 4 illustrates a block diagram of a device for transmitting data according to an exemplary embodiment of the present inventive concept.

FIG. 4 illustrates a block diagram of a device (e.g., the second electronic apparatus) for transmitting data according to an exemplary embodiment of the present inventive concept. Here, the device initially performs communication using a second wireless communication manner.

As shown in FIG. 4, the device for transmitting data according to an exemplary embodiment of the present inventive concept includes: a first wireless communication module 201 (e.g., a first wireless transceiver), a determination unit 202 (e.g., a CPU or microprocessor), and a second wireless communication module 203 (e.g., a second wireless transceiver).

The first wireless communication module 201 is configured to receive a data transmission request message sent by a first electronic apparatus through the first wireless communication manner. The data transmission request message includes indicating information which is used to indicate that the first electronic apparatus desires to perform data transmission using a second wireless communication manner.

In an embodiment, a data transmission rate of the first wireless communication manner is lower than that of the second wireless communication manner.

In another embodiment, a data transmission rate and power consumption of the first wireless communication manner are each lower than those of the second wireless communication manner.

As an example, the indicating information may include at least one of information for indicating a data amount of data to be transmitted, information for indicating a data type of data to be transmitted, information for indicating a preset event occurring currently, information for indicating a type of the second wireless communication manner, and preset byte information.

The determination unit 202 is configured to determine whether to perform data transmission with the first electronic apparatus through the second wireless communication manner according to the indicating information. The first wireless communication module 201 sends a data transmission acknowledgement message to the first electronic apparatus through the first wireless communication manner after the determination unit 202 determines the device (i.e., the second electronic apparatus) is to perform a data transmission with the first electronic apparatus through the second wireless communication manner.

The second wireless communication module 203 is configured to perform data transmission with the first electronic apparatus through the second wireless communication manner after the first wireless communication module 201 sends the data transmission acknowledgement message to the first electronic apparatus through the first wireless communication manner.

As an example, the determination unit 202 determines the second electronic device is to stop performing data transmission with the second electronic apparatus through the second wireless communication manner when at least one of the following conditions is satisfied: receiving a user instruction for stopping performing data transmission with the first electronic apparatus through the second wireless communication manner; and receiving a message, sent by the first electronic apparatus, for notifying to stop performing data transmission through the second wireless communication manner.

In an embodiment, the first electronic apparatus or the second electronic device includes a computer readable storage medium, having a computer program stored thereon. In an embodiment, the computer program is configured to cause a processor of a computer to execute the method of transmitting data as described in the above exemplary embodiments.

The method and device of transmitting data according to the exemplary embodiments of the present inventive concept can cause an electronic apparatus to perform data transmission with another electronic apparatus through a proper wireless communication manner according to various circumstances, thereby enabling multiple requirements to be met such as low power consumption and ensuring a certain transmission date.

In addition, it should be understood that each of the units and modules in the device for transmitting data according to exemplary embodiments of the present inventive concept may be implemented as a hardware component and/or a software component. In an exemplary embodiment, one or more of the above-described units is implemented by using a Field Programmable Gate Array (FPGA) or an Application Specific Integrated Circuit (ASIC).

In addition, the method of transmitting data according to at least one exemplary embodiment of the present inventive concept may be implemented as computer code in a computer readable recording medium. One of ordinary skill in the art may implement the computer code according to the descriptions of the above method. When the computer code is executed in a computer, the above method of the present disclosure is implemented.

Although some exemplary embodiments of the present inventive concept are described above, those skilled in the art should understand that, modifications may be made to these embodiments without departing from the principle and spirit of the present disclosure.

What is claimed is:

1. A method of operating a first electronic apparatus configured to initially perform a data transmission with a second electronic apparatus through a first wireless communication manner, comprising:
   detecting, by the first electronic apparatus, a preset event indicating appearance of an object;
   sending, by the first electronic apparatus, a message to the second electronic apparatus through the first wireless communication manner, the message indicating the data transmission to be performed through a second wireless communication manner different from the first wireless communication manner;
   receiving, by the first electronic apparatus, an acknowledgement from the second electronic apparatus through the first wireless communication manner; and
   in response to the acknowledgement, sending, by the first electronic apparatus, multimedia data to the second electronic apparatus through the second wireless communication manner, the multimedia data being related to the object.

2. The method claim 1, wherein a first data transmission rate of the first wireless communication manner is lower than a second data transmission rate of the second wireless communication manner.

3. The method claim 1, wherein the first wireless communication manner is based on a ZigBee network, and
   wherein the second wireless communication manner is based on one of a Wi-Fi Direct network, a Wi-Fi network, and a Bluetooth network.

4. The method claim 1, wherein the first electronic apparatus includes a door guard that is configured to detect the appearance of the object, and
   wherein the second electronic apparatus is configured to provide image data as the multimedia data to a user.

5. The method claim 1, further comprising:
   determining, by the first electronic apparatus, whether to stop performing the data transmission with the second electronic apparatus through the second wireless communication manner.

6. The method claim 5, wherein determining whether to stop performing the data transmission with the second electronic apparatus through the second wireless communication manner is based on at least one of:
   receiving a user instruction for stopping performing data transmission with the second electronic apparatus through the second wireless communication manner;
   determining that a first priority of performing data transmission with the second electronic apparatus is lower than a second priority of performing data transmission with a third electronic apparatus; and
   receiving a message, sent by the second electronic apparatus, for notifying to stop performing data transmission through the second wireless communication manner.

7. A method of operating a first electronic apparatus configured to initially perform a data transmission with a second electronic apparatus through a first wireless communication manner, comprising:
   receiving, by the first electronic apparatus, a message from the second electronic apparatus through the first wireless communication manner, the message indicating the data transmission by a second electronic apparatus to be performed through a second wireless communication manner different from the first wireless communication manner, and the message being based on a preset event indicating appearance of an object;
   sending, by the first electronic apparatus, an acknowledgement to the second electronic apparatus through the first wireless communication manner; and
   receiving, by the first electronic apparatus, multimedia data from the second electronic apparatus through the second wireless communication manner, the multimedia data being related to the object.

8. The method claim 7, wherein the first wireless communication manner is based on a ZigBee network, and
   wherein the second wireless communication manner is based on one of a Wi-Fi Direct network, a Wi-Fi network, and a Bluetooth network.

9. The method claim 7, wherein the first electronic apparatus is configured to provide the image data to an user, and
   wherein the second electronic apparatus includes a door guard that is configured to detect the appearance of the object.

10. The method claim 7, further comprising:
    generating, by the first electronic apparatus, a user instruction for stopping the data transmission by the second electronic apparatus through the second wireless communication manner; and
    sending, by the first electronic apparatus, the user instruction to the second electronic apparatus.

11. A method of operating a system including a first electronic apparatus and a second electronic apparatus configured to initially wirelessly communicate with each other through a first wireless communication manner, comprising:
    detecting, by the first electronic apparatus, a preset event indicating appearance of an object;
    sending, by the first electronic apparatus, a message to the second electronic apparatus through the first wireless communication manner, the message indicating the data transmission to be performed through a second wireless communication manner different from the first wireless communication manner;

sending, by the second electronic apparatus, an acknowledgement to the first electronic apparatus through the first wireless communication manner; and in response to the acknowledgement, sending, by the first electronic apparatus, multimedia data to the second electronic apparatus through the second wireless communication manner, the multimedia data being related to the object.

12. The method of claim 11, further comprising:

generating, by the second electronic apparatus, a user instruction for stopping the data transmission by the first electronic apparatus through the second wireless communication manner; and sending, by the second electronic apparatus, the user instruction to the first electronic apparatus.

13. The method of claim 12, wherein determining whether to stop performing the data transmission with the second electronic apparatus through the second wireless communication manner is based on at least one of:

receiving the user instruction for stopping performing data transmission by the first electronic apparatus through the second wireless communication manner;

determining that a first priority of performing data transmission with the second electronic apparatus is lower than a second priority of performing data transmission with a third electronic apparatus; and receiving a message, sent by the second electronic apparatus, for notifying to stop performing data transmission through the second wireless communication manner.

14. The method of claim 11, wherein a first data transmission rate of the first wireless communication manner is lower than a second data transmission rate of the second wireless communication manner.

15. The method of claim 11, wherein the first wireless communication manner is based on a ZigBee network, and wherein the second wireless communication manner is based on one of a Wi-Fi Direct network, a Wi-Fi network, and a Bluetooth network.

16. The method of claim 11, wherein the first electronic apparatus includes a door guard that is configured to detect the appearance of the object, and wherein the second electronic apparatus is configured to provide the image data to a user.

17. The method of claim 11, further comprising:

determining, by the first electronic apparatus, whether to stop performing the data transmission with the second electronic apparatus through the second wireless communication manner.

* * * * *